United States Patent [19]
Fletcher et al.

[11] 3,715,600
[45] Feb. 6, 1973

[54] STACKED SOLAR CELL ARRAYS

[75] Inventors: James C. Fletcher, Administrator of the National Aeronautics and Space Administration with respect to an invention of; Jerome M. Weingart, Pasadena, Calif.; Robert K. Yasui, Los Angeles, both of Calif.

[73] Assignee: The United States of America as represented by the National Aeronautics and Space Administration

[22] Filed: Nov. 22, 1971

[21] Appl. No.: 200,762

[52] U.S. Cl. ............... 250/212, 250/234, 244/1.55, 60/26
[51] Int. Cl. .......................... F64c 39/00, F03g 7/02
[58] Field of Search ........ 60/26; 250/211 J, 212, 234; 244/1 SS

[56] References Cited

UNITED STATES PATENTS

| | | | |
|---|---|---|---|
| 3,089,670 | 5/1963 | Johnson | 60/26 X |
| 3,300,162 | 1/1967 | Maynard et al. | 244/1 SS |
| 3,326,497 | 6/1967 | Michelson | 250/212 X |
| 2,949,498 | 8/1960 | Jackson | 250/212 |

*Primary Examiner*—Martin P. Schwadron
*Assistant Examiner*—Allen M. Ostrager
*Attorney*—Monte F. Mott et al.

[57] ABSTRACT

A solar cell stack, for use in a spacecraft or the like, is disclosed. In the stack only the top solar cell panel is exposed to solar energy to provide electrical power. Except the top panel each panel is covered from exposure to damaging bombarding particles by the preceding panels in the stack toward the stack top. When the exposed top panel's performance is degraded, due to bombardment by particles or other unexpected failure, the top panel is ejected, thereby exposing the underlying panel in the stack, which not becomes the power supplying panels. Each panel in the stack is successively exposed when the panel above it is ejected.

8 Claims, 4 Drawing Figures

PATENTED FEB 6 1973 3,715,600
SHEET 1 OF 2

JEROME M. WEINGART
ROBERT K. YASUI
INVENTORS

BY
ATTORNEYS

JEROME M. WEINGART
ROBERT K. YASUI
INVENTORS

ATTORNEYS

STACKED SOLAR CELL ARRAYS

ORIGIN OF INVENTION

The invention described herein was made the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention generally relates to solar arrays and, more particularly, to a stacked solar array.

2. Description of the Prior Art

The use of solar cell arrays or panels to provide electrical power in spacecrafts or satellites is well known. Bombardment of these solar panels by energetic electrons, protons, and micrometeorites in space results in damage, which decreases panel power output. Earth satellites encounter energetic electrons and protons trapped in the earth's magnetic field. Both satellites and interplanetary spacecraft may encounter high energy protons from solar flares. In the design of solar cell power systems with the present state-of-the-art technology, consideration is given to the flux and energy distribution of these particles, anticipated for a particular mission. The types of solar cells, types and thickness of coverglass shielding, and other parameters are optimized to minimize damage and associated power degradation. Even with careful design, the solar cells eventually degrade in the space environment to the point at which they are no longer operational. In time, available power decreases to the point at which the onboard electronics can no longer function properly. As a result, additional spacecraft must be periodically constructed, tested, and placed into a similar orbit to replace the spacecraft with the equipment which became degraded or nonoperative, merely due to the failure of the solar panels. Clearly if the performance life of a solar panel can be extended beyond that possible with presently known techniques, the useful life of spacecrafts will be extended greatly, resulting in large savings in expeditures.

OBJECTS AND SUMMARY OF THE INVENTION

It is a primary object of the present invention to provide a new solar panel arrangement.

Another object is to provide an arrangement of solar panels for use in spacecrafts or the like to extend the life during which adequate power output is provided to the spacecraft.

A further object of the invention is to provide a method of operating solar panels in a spacecraft to extend the life during which adequate power output is provided to the spacecraft.

These and other objects of the invention are achieved by providing in a spacecraft a plurality of stacks of solar panels. In each stack only the top panel is exposed while the other panels are protected from exposure by proceding panels in the stack. Only the exposed panel provides the output power which is supplied to the spacecraft in a conventional manner. When the performance of the exposed panel is degraded, due to bombardments by various particles or for any other unexpected panel failure, the exposed panel is ejected. When ejected it exposes the panel below it which becomes the power-supplying panel. Since at any time only one panel of the stack is exposed, the life during which adequate power is provided is extended to the duration required for each of the panels to become exposed and affected by particle bombardment.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
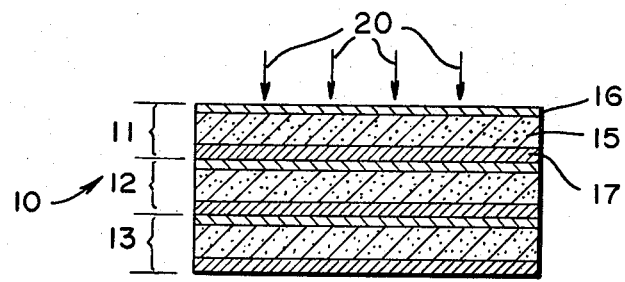
FIG. 1 is a simple cross-sectional view of a stack of a plurality of solar cell panels in accordance with the teachings of the present invention.

Attention is first directed to FIG. 1 wherein a stack 10 of solar panels is diagrammed. The stack is shown consisting of a plurality of panels, e.g., 3, which are designated by numerals 11–13 from top to bottom. Each panel is assumed to consist of solar cells 15, protected by a top coverglass 16 and supported on a metal panel or shield 17. In FIG. 1, only solar panel 11 is shown exposed to solar energy, represented by arrows 20. Each of the other solar panels is protected from exposure to either solar energy or to damaging bombarding particles by the panels preceding it in the stack.

In accordance with the present invention only the exposed solar panel 11 at the top of stack 10 provides the output power. Then, when its performance is degraded, due to damage from particle bombardment or any unexpected failure, it is ejected by an ejection mechanism, thereby exposing the previously protected solar panel under the top panel. The newly exposed panel now becomes the power source.

Practical studies show that each solar panel may consist of solar cells 15 of a thickness in the range of 0.014 inch and a coverglass 16 about 0.006 inch thick. The shield 17 might typically be of metal, such as aluminum of a suitable alloy and temper on the order of 0.26 inch thick. Thus the total shielding for the protected panel under the exposed panel would be in the order of 0.040 inch thick. Such shielding thickness is expected to provide about 90 percent protection for the unexposed panel. That is, panel 12 would be damaged at only 10 percent of the rate of damage of the exposed panel 11. Thus for practical purposes the unexposed panel may be assumed to be substantially protected from bombardment damage.

The specific advantages of the present invention may be summarized as follows:

1. The various solar panels which are to be stacked are constructable with present state-of-the-art technology;

2. The stacked panels provide redundancy to provide protection against partial or catastrophic electrical damage;

3. The use of the stacked panels provides a solution to radiation damage at present before radiation hardened silicon solar cells are available;

4. The present invention provides protection against radiation damage as well as against damage by micrometeorites, a type of damage which would not be protected by radiation hardened cells if and when such cells are available; and 5. The increased cost of stacking panels, rather than using single panels as has been done in the prior art, is minimal compared with the savings realized by the increased life of spacecrafts.

It should be appreciated that various known ejection techniques may be employed to eject the top panel of the stack and expose the underlying panel. Electromechanical or pyrotechnic devices may be used to this end. The ejected panels would be carried away by centrifugal or gravity forces, depending on the spacecraft's stabilizing technique. Also, any known technique may be used to connect all the panels to the power unit in the spacecraft in order to receive the output power from the top, exposed panel.

Figure 2:
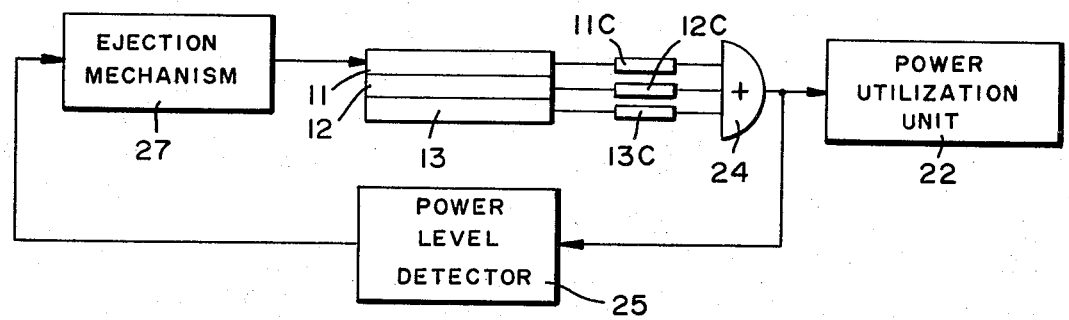
FIG. 2 is a block diagram of the circuitry of the present invention.

Attention is now directed to FIG. 2 which is a simplified diagram of the three panel stack 10, together with an ejection mechanism and a power utilization unit. The diagram is presented to further explain the invention rather than to limit the invention thereto. Therein, the outputs of the three solar panels 11, 12 and 13 of stack 10 are shown connected in parallel through respective disengagable connectors 11c, 12c and 13c, to power utilization unit 22 through a gating arrangement, such as an OR gate 24. In practice, no power is provided by the unexposed panels, with power being supplied only by the exposed panel. Thus the output of OR gate 24 is only the output power of the top panel.

Figure 3:
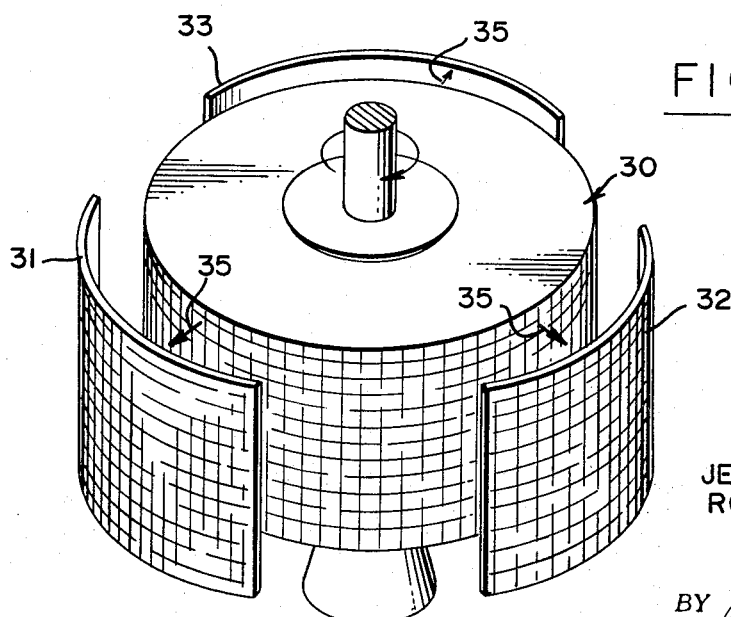
FIGS. 3 and 4 are isometric diagrams of spacecrafts in which the present invention is incorporated.

The output power of gate 24 is detected by a detector 25. When the top panel's performance is degraded and the output power falls below an acceptable level, detector 25 activates an ejection mechanism 27. The latter may be an electromechanical or pyrotechnic device which when activated, would release and separate the top panel from the stack thereby exposing the underlying panel. Once the panel is separated, gravity or centrifugal forces would remove the separated panel from the spacecraft path. FIG. 3 is a simplified diagram of a spinning type satellite 30, showing three top panels 31, 32 and 33 of three different stacks shown being removed from the satellite by centrifugal forces represented by arrows 35.

Figure 4:
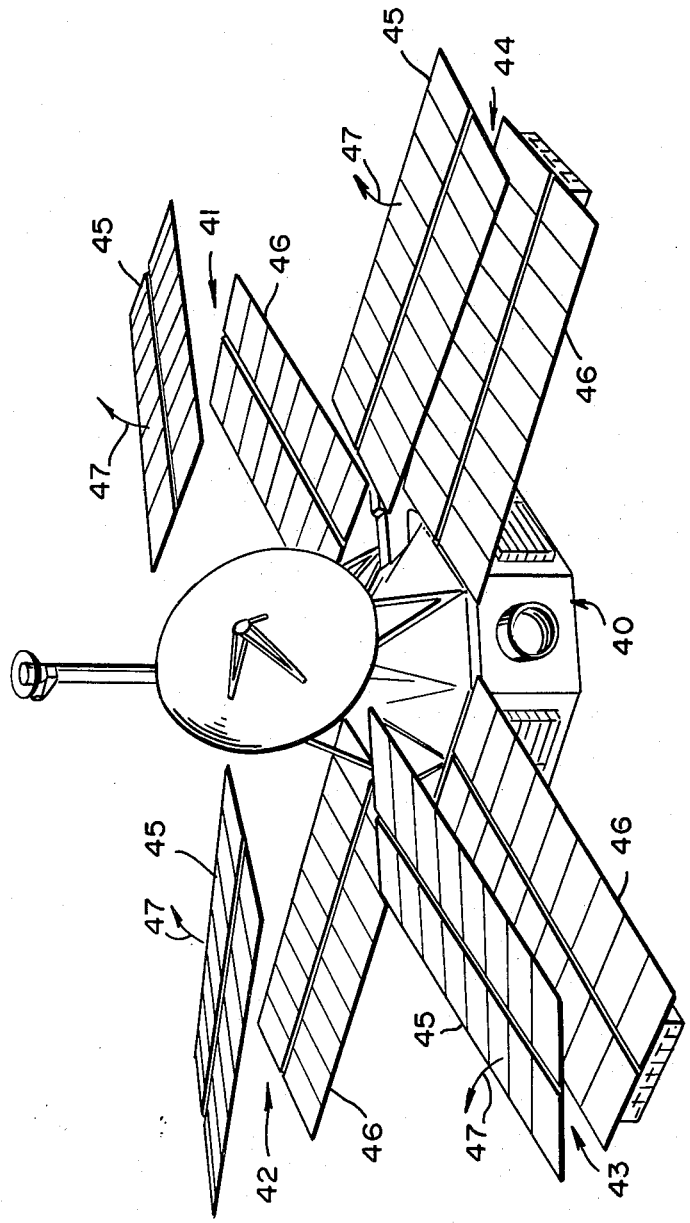

It should be pointed out that the ejection of the top panel may affect the spacecraft direction due to undesired yawing or rolling. This can be avoided by placing several stacks symmetrically about the spacecraft and simultaneously ejecting the top panels of all the stacks. Such an arrangement is shown in FIG. 4 wherein four stacks symmetrically arranged about the axis of a spacecraft 40 are designated by numerals 41–44. The ejected top panel of each stack is designated by numeral 45 and the underlying panel which is being exposed is designated by numeral 46. The directions of ejection of the four panels are designated by arrows 47.

It should be stressed that the present invention differs from expandable solar panel configurations in which the exposed solar cell area is extended or increased to increase the power output. Herein the exposed area is always the same, as is not changed. In accordance with the present invention when the top panel becomes defective, it is ejected to expose an undamaged panel of equal area. The present invention is particularly useful in communication satellites which are area-limited and spin stabilized, in which expandable solar panels can't be used due to area limitations.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a spacevehicle or the like of the type including a solar panel for providing electrical power when exposed to solar radiation, the improvement comprising:

a first solar panel exposed to solar radiation and at least a second solar panel adapted to be exposed to solar radiation;

utilization means coupled to said first and second solar panels for receiving power from the exposed panel; and control means for ejecting said first solar panel and for exposing said second solar panel to solar radiation when the power received from said first panel is degraded below a selected value.

2. The arrangement as recited in claim 1 wherein said first and second panels define a stack with said first panel being on top of said second panel so that when said first panel is ejected said second panel is automatically exposed to solar radiation.

3. The arrangement as recited in claim 2 further including a shield between said first and second stacks which is ejected by said control means together with said first panel to expose the second panel thereunder.

4. The arrangement as recited in claim 2 wherein said improvement comprises a plurality of panel stacks each including a plurality of solar panels with the top panel of each stack being exposed to solar radiation, with each subsequent panel being covered by the preceding panels in the stack whereby when the top panel is ejected the panel below it is exposed to solar radiation while covering the panels thereunder.

5. The arrangement as recited in claim 4 wherein each stack includes a separate shield between adjacent panels in the stack and said control means when ejecting the top panel of the stack further ejects the shield thereunder to expose the underlying panel to solar radiation.

6. The method of providing power in a satellite and the like from solar energy, the steps comprising:

exposing a first solar panel to solar energy to provide power therefrom;

providing a second solar panel which is not exposed to radiation of solar energy; and ejecting the first solar panel when the power provided thereby is degraded below a selected value and thereby exposing said second solar panel to radiation of solar energy.

7. The method as recited in claim 6 wherein said first and second panels form a stack with said first panel on top so as to cover said second panel while being exposed to radiation of solar energy, whereby when said first panel is ejected it automatically exposes the second panel below it in the stack to radiation of solar energy.

8. The method as recited in claim 7 wherein the stack includes a separate shield between said first and second panels and wherein said shield is ejected together with said first panel to expose the underlying second panel.

* * * * *

Notice of Adverse Decision in Interference

In Interference No. 98,539, involving Patent No. 3,715,600, J. C. Fletcher, Administator of the National Aeronautics and Space Administration with respect to an invention of J. M. Weingart and R. K. Yasui, STACKED SOLAR CELL ARRAYS, final judgment adverse to the patentees was rendered Dec. 16, 1974, as to claims 1, 2, 4, 6 and 7.

[*Official Gazette May 6, 1975.*]